United States Patent [19]

Frewer et al.

[11] Patent Number: 4,669,270
[45] Date of Patent: Jun. 2, 1987

[54] POWER GENERATING STATION WITH A HIGH-TEMPERATURE REACTOR AND A PLANT FOR MANUFACTURING CHEMICAL RAW MATERIALS

[75] Inventors: Hans Frewer, Marloffstein; Rainer Müller, Erlangen; Ulrich Schiffers, Eckental, all of Fed. Rep. of Germany

[73] Assignee: Kraftwerk Union Aktiengesellschaft, Mülheim, Fed. Rep. of Germany

[21] Appl. No.: 725,011

[22] Filed: Apr. 18, 1985

[30] Foreign Application Priority Data

Apr. 21, 1984 [DE] Fed. Rep. of Germany ....... 3415223

[51] Int. Cl.⁴ ............................................. F01K 27/00
[52] U.S. Cl. ...................................................... 60/648
[58] Field of Search ............................................ 60/648

[56] References Cited

U.S. PATENT DOCUMENTS 3,533,739 10/1970 Pelczarski .

Primary Examiner—Allen M. Ostrager
Attorney, Agent, or Firm—Herbert L. Lerner; Laurence A. Greenberg

[57] ABSTRACT

Power generating station with a high-temperature reactor, a steam power generating station connected to the high-temperature reactor, a plant for generating hydrogen from carbon-containing material, with a coal gasifier for the hydrogenating coal gasification, a gas purification plant connected to the gas stream of the coal gasifier, a low-temperature gas separation plant following the gas purification and a tube cracking furnace which is connected to the methane line of this gas decomposition plant heated by the heat transporting medium of the high-temperature reactor for cracking a methane/steam mixture, and with a gas processing plant which is connected to the exhaust gas line of the tube cracking furnace and consists of at least one heat exchanger, a converting plant and a carbon dioxide scrubber. The residual coke of the coal gasifier is fed to an iron bath gasifier and the exhaust gas of the iron bath gasifier is fed, via a heat exchanger plant together with a part of the hydrogen gas leaving the gas processing plant following the tube cracking oven, to a plant for producing chemical raw material.

19 Claims, 1 Drawing Figure

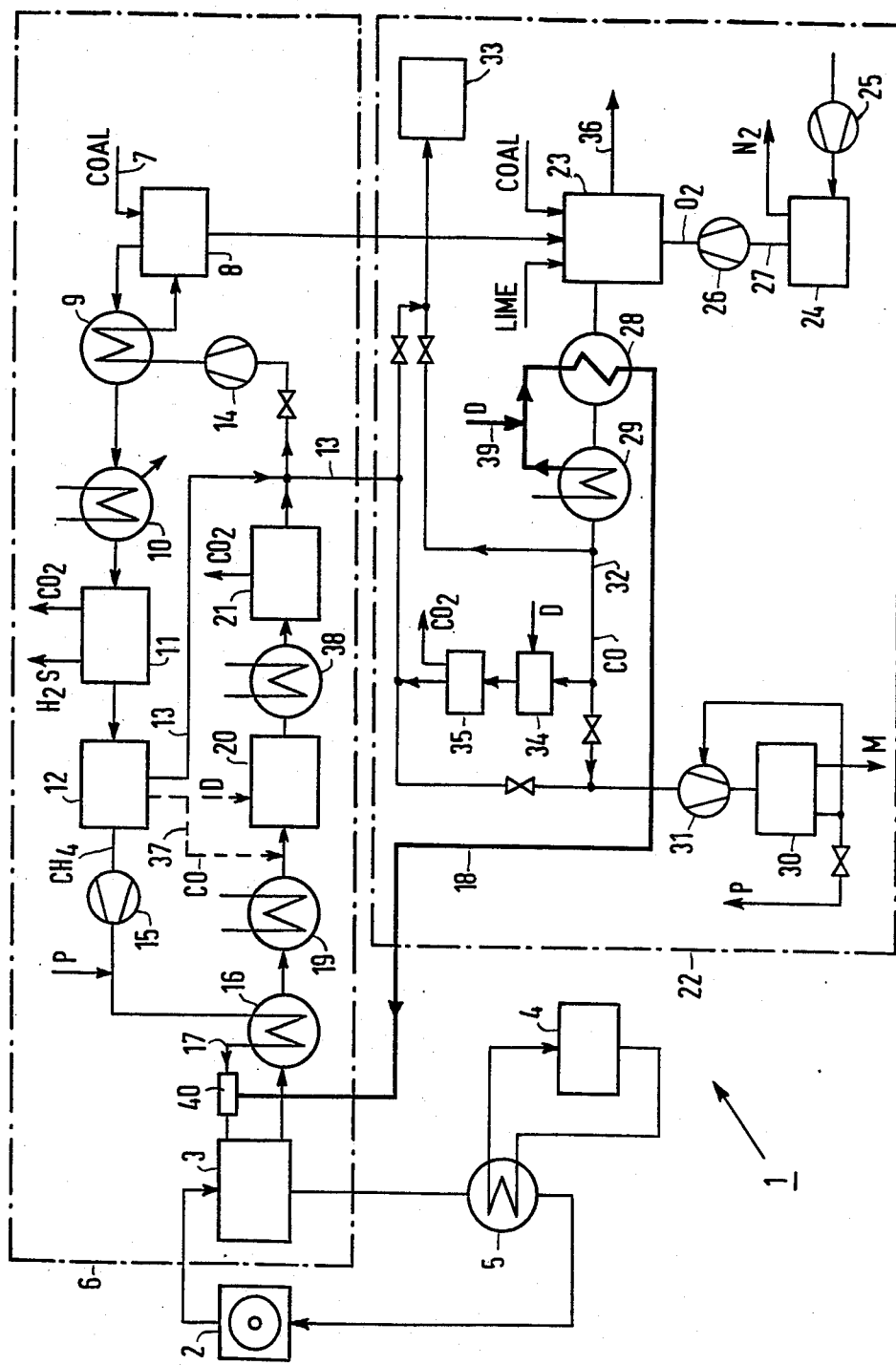

POWER GENERATING STATION WITH A HIGH-TEMPERATURE REACTOR AND A PLANT FOR MANUFACTURING CHEMICAL RAW MATERIALS

BACKGROUND OF THE INVENTION

1. Field of the Invention

The invention relates to a power generating station comprising a high-temperature reactor, a steam power generating station connected to the high-temperature reactor and a plant for generating hydrogen from carbon-containing material, a coal gasifier for the hydrogenating coal gasification, a gas purifier for treating the gas stream of the coal gasifier, a low-temperature gas separation plant following the gas purifier, a tubular cracking furnace for cracking a methane/steam mixture, which furnace is connected to the methane line of the gas separation plant and is heated by the heat transport medium of the high-temperature reactor, and a gas processing plant which is connected to the exhaust gas line of the tube cracking furnace, consisting of at least one heat exchanger, a conversion plant and a carbon dioxide scrubbing plant.

2. Description of the Prior Art

The economic advantages of a power generating station, in which the heat generation of a high-temperature reactor is utilized not only for the generation of steam for a steam power generating plant, but also for operating a tube cracking furnace for decomposing a methane/hydrogen mixture obtained by the hydrogenating coal gasification, are known. Here, the high temperature of the heat transport medium of a high-temperature reactor can be utilized not only for generating steam but additionally also for producing carbon monoxide gas and hydrogen gas. In conjunction with such a plant, it is also known to convert the exhaust gas of a tube cracking furnace into hydrogen and carbon dioxide gas in a converting plant, while feeding-in steam, and to remove the carbon dioxide gas by means of a carbon dioxide scrubber connected thereto from the gas stream. The remaining hydrogen gas could be used in such a power generating station concept as desired after subtracting the recirculating amount of hydrogen required for the hydrogenating coal gasification.

However, with such a power-generating station concept, the residual coke remaining in the hydrogenating coal gasification could no longer be burned economically in power-generating station boilers because of its relatively high sulfur content in view of the presently applicable sulfur dioxide emission limits. Also the gasification of this residual coke in a helium-heated steam gasifier would encounter problems regarding the materials and reaction technology.

SUMMARY OF THE INVENTION

It is therefore an object of the invention to provide a method of economically using the high sulfur containing residual coke which is produced in the hydrogenating coal gasification. In addition, the thermal efficiency of the power-generating station and the utilization of the raw materials employed in the connected plant for generating hydrogen gas is improved.

With the foregoing and other objects in view, there is provided in accordance with the invention a power generating station with a high-temperature reactor, a steam power generating station connected to the high-temperature reactor, a plant for generating hydrogen from carbon-containing material, with a coal gasifier for partial hydrogenating coal gasification leaving residual coke, a gas purification plant connected to the gas stream of the coal gasifier, a low-temperature gas separation plant following the gas purification which separates a methane fraction from the gas stream of the coal gasifier and, a tube cracking furnace which is connected to the methane line of this gas separation plant, heated by the heat transporting medium of the high-temperature reactor, for cracking a methane steam mixture, a gas processing plant which is connected to the exhaust gas line of the tube cracking furnace and consists of at least one heat exchanger, a converting plant and a carbon dioxide scrubber, the combination therewith of an iron bath gasifier comprising a molten iron body in an enclosed vessel to which the residual coke of the coal gasifier is fed, a heat exchanger plant for removing heat from the exhaust gas of the iron bath gasifier and for superheating steam, means for co-mingling a part of the hydrogen gas leaving the gas processing plant following the tube cracking furnace, with the exhaust gas of the iron bath gasifier, and a plant for producing chemical raw materials to which the co-mingled gases are fed.

Other features which are considered as characteristic for the invention are set forth in the appended claims.

Although the invention is illustrated and described herein as embodied in a power generating station with a high-temperature reactor and a plant for manufacturing chemical raw materials, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates a power generating station which includes a high-temperature reactor, a steam power plant connected to the high-temperature reactor, a plant for generating hydrogen from carbon-containing material which embraces a coal gasifier for the hydrogenating coal gasification, a tube cracking furnace for cracking methane and a conversion plant, an iron bath gasifier for the conversion of residual coke and the removal of sulfur and a plant for the production of chemicals as raw materials.

DESCRIPTION OF THE PREFERRED EMBODIMENT

The invention relates to a power generating station with a high-temperature reactor, a steam power generating station connected to the high temperature reactor, and a plant for generating hydrogen from carbon-containing material. In such a power generating station, the problem arises to make logical further use of the residual coke which is produced in the hydrogenating coal gasifier and contains much sulfur, without exceeding the sulfur dioxide emission limits. To this end, the invention provides that the residual coke of the coal gasifier is fed to an iron bath gasifier. The exhaust gas of the iron bath gasifier is fed via a heat exchanger system, and the cooled exhaust gas together with a part of the hydrogen gas leaving the gas processing plant connected to the tube cracking furnace is fed to a plant for producing chemical raw materials. A power generating station according to the invention is suitable particularly for use in chemical plants with a high-temperature reactor or for nuclear power generating stations with a high-temperature reactor and provides a means of using fossil fuels.

According to the invention, the residual coke of the coal gasifier is fed to an iron bath gasifier and the exhaust gas of the iron bath gasifier is fed to a heat exchanger plant and thereafter together with a part of the hydrogen gas leaving the gas processing plant following the tube cracking furnace, to a plant for producing chemical raw materials.

Connecting an iron bath gasifier to the hydrogenating coal gasifier makes it possible to convert the high sulfur-containing residual coke into carbon monoxide gas and small quantities of hydrogen gas and in the process to bind the sulfur contained in the residual coke in the slag. The slag can be skimmed off and discharged with the sulfur bound in it. In addition, the very high temperature level of an iron bath gasifier(the carbon monoxide-containing exhaust gases leave the iron bath gasifier at approximately 1500° C.) may be utilized to impart additional heat to the tube cracking furnace for cracking the methane therein by heating the medium pressure steam required therefor to temperatures above those of the heat transport medium of the high-temperature reactor. By preheating the methane mixed with the very hot steam, the heat supply by the heat transport medium of the high-temperature reactor can be reduced and required input temperature of the heat transport medium of the high-temperature reactor to the tube cracking oven can be lowered. Thus, the problems connected with very high output temperatures of the heat transport medium of the high-temperature reactor can be avoided.

By connecting a coal gasifier for the hydrogenating coal gasification and an iron bath gasifier in series, the plant is adaptable to process different types of coal and other fossil fuel grades such as hard coal, lignite, heavy oil residue, oil shale and oil sand and capable of maintaining a stoichiometric ratio of hydrogen and carbon monoxide suitable for the manufacture of chemical raw materials in the following plant. These different, carbon containing materials can be fed into the coal gasifier as well as also as an admixture to the residual coke into the iron bath gasifier. The heat balance in the iron bath gasifier is maintained sufficiently positive so that the iron bath cannot freeze due to minor temporary temperature reductions. The adaptability of this plant to providing different stoichiometric ratios of hydrogen and carbon monoxide can be greatly enhanced by adding a converting plant with a following carbon dioxide scrubber to the exhaust line of the iron bath gasifier.

A particularly efficient utilization of the individual structural assemblies of the power generating station as well as minimizing the same can be achieved if plants for manufacturing chemical raw materials with different requirements as to the stoichiometric ratio of hydrogen and carbon monoxide are connected parallel to each other. Thus, for instance a steel mill with its requirement of carbon monoxide-containing reduction gas and a methanol synthesis plant or ammonia synthesis plant with the increased requirement for hydrogen gas can be connected to the power generating station. In this case, the converting plant which can be connected to the iron bath gasifier need be designed with a capacity for only a part of the stream of the exhaust gas of the iron bath gasifier or can even be omitted entirely.

Further details of the invention will be explained with the aid of an embodiment example.

The drawing shows a schematic presentation of the power generating station according to the invention comprising a high-temperature reactor and a connected plant for generating hydrogen gas from fossil fuels.

In the drawing, the power generating station 1 according to the invention is shown schematically. A gas-heat transport medium such as helium gas from a high-temperature nuclear reactor 2 is first fed to a tube cracking furnace 3, then to a steam generator 5 associated with a steam power generating station 4 and subsequently back to the high-temperature reactor 2.

In the connected plant 6 for generating hydrogen gas from fossil fuels, fossil fuel is fed via a supply line 7, to a coal gasifier 8 where the fossil fuel, in particular coal, is partially gasified by hydrogenation with hydrogen gas to form a gas rich in methane. The exhaust gas of the coal gasifier flows successively through a heat exchanger 9, in which it gives off part of its heat to hydrogen gas which flows into the coal gasifier in counterflow to the exhaust gas, and then the exhaust gas flow through a steam generator arrangement 10 in which the medium pressure and/or low pressure steam is generated. This steam generator arrangement is followed by gas purifier 11 in which the now cooled-down exhaust gases are freed of dust particles, and carbon dioxide and sulfur compounds are removed. This gas purification plant is followed by a low-temperature gas separation plant 12, in which methane is separated from hydrogen gas and the carbon monoxide gas contained in the purified gas. The hydrogen and the carbon monoxide gas produced in small quantities are fed to a hydrogen supply line 13. Part of the hydrogen is returned by a compressor 14 through the heat exchanger 9 through which the exhaust gas stream of the coal gasifier 8 flows, back into the coal gasifier 8. The methane fraction is forced by another compressor 15 through a further heat exchanger 16 through which the exhaust gas stream of the tube cracking furnace 3 flows. A feedline 18 through which a highly superheated steam flows opens into line 17 through which methane flows leading into tube cracking furnace 3. The heated methane-steam mixture which flows into the tube cracking furnace 3 is cracked in the tube cracking furnace 3 heated by the heat transport medium of the high-temperature reactor 2, to form hydrogen and carbon monoxide. The exhaust gases of the tube cracking furnace 3 which has a temperature of about 800° C. flow through the above-mentioned heat exchanger 16 in which the methane flowing into the tube cracking furnace 3 is heated up. Then the exhaust gases are further cooled in steam generator 19 connected to the heat exchanger 16, in which medium pressure steam is generated. Heat exchanger 16 and steam generator 19 are followed on the exhaust gas side by a conversion plant 20 in which the carbon monoxide- and steam-containing exhaust gases of the tube cracking furnace 3 which have in the meantime been cooled-down to about 400° C., are converted into hydrogen and carbon dioxide. After the converted gas is cooled in a second heat exchanger 38, the carbon dioxide is washed out in a subsequent carbon dioxide scrubber 21. Part of the remaining hydrogen is conducted via the hydrogen supply line 13, the compressor 14 and the heat exchanger 9, through which the exhaust gas of the coal gasifier flows, into the coal gasifier 8 for hydrogenating coal gasifier. The remainder of the hydrogen is available for other uses, in the present case for a plant 22 for the productions of chemical raw materials. It can be fed to the former via the hydrogen supply line 13. The coal gasifier 8 is followed by an iron bath gasifier 23 for utilizing the residual coke from the coal gasifier 8. The iron bath gasifier can be fed not only the residual coke, to which lime had been admixed before, but additionally further fossil fuels, depending on the mode of operation. Oxygen is further blown into the iron bath gasifier 23. The oxygen comes from an air separation plant 24 which precedes the iron bath gasifier 23 and is in turn connected to an air compressor 25. A further compressor 26 is built into the oxygen line 27 of the air separation plant 24 for bringing the oxygen to the pressure level of the iron bath gasifier. The exhaust hot gases from the iron bath gasifier 23, at a temperature of about 1500° C., contain substantially sulfur-free carbon monoxide, and flow successively through two heat exchangers 28 and 29 which are connected to the iron bath gasifier 23. Medium-pressure steam flows counterflowwise to the exhaust hot gases passing through heat exchangers 28 and 29 and the steam during its passage is heated to above 1000° C. Medium pressure steam which is generated in the steam generator arrangement 10 and the steam generator 19 is additionally superheated in the heat exchanger which follows the iron bath gasifier 23 immediately. The steam designated D is fed-in at line 39 and superheated. The steam flowing through line 18 may be heated above the entrance temperature of the heat transporting medium (helium) of the high-temperature reactor 2 in the tube cracking furnace 3. The thus heated steam is admixed with methane flowing through line 17 in pressure-increasing ejector 40 and the resultant steam/methane mixture fed to the inlet of tube cracking furnace 3. The exhaust gas of the iron bath gasifier 23 containing predominantly carbon monoxide which flows from the two heat exchangers 28 and 29 wherein it is cooled off, is fed, together with part of the available hydrogen in the hydrogen supply line 13 from the low-temperature separation plant 12 and from the converting plant 20 connected to the tube cracking furnace 3 to a compressor 31 preceding a methanol synthesis plant 30. The methanol M generated in the methanol synthesis plant 30 can be stored (not shown) and sold as raw material. The synthesis exhaust gas not completely reacted in the methanol synthesis plant which contains carbon monoxide and hydrogen, is returned predominantly to the compressor 31 for recirculation and, to a small degree, is admixed as so-called purge gas P directly to the methane flowing into the tube cracking furnace 3.

Part of the gas flowing from the heat exchangers 28 and 29 via the gas line 32 which contains predominantly carbon monoxide is advantageously utilized as reduction gas and is fed, for instance, to a steel mill 33. For this purpose it can be enriched with hydrogen from the hydrogen line 13. The gas line 32 at the source end is connected to the iron bath gasifier 23 and in the embodiment example is connected to a further converting plant 34 followed by a carbon dioxide scrubber 35. By means of this converting plant 34 which is separately fed with steam D, part of the carbon monoxide can be converted into hydrogen if needed, if according to the demand, too little hydrogen is available as compared to the carbon monoxide.

In the reaction of matter by the hydrogenating coal gasifier 8, the gas purification plant 11, the low-temperature gas separation plant 12, the tube cracking furnace 3 as well as the converting plant 20, the heat derived from the high-temperature reactor 2 is used to increase the yield of hydrogen gas relative to the quantity of the fossil fuel charged-in. The yield of hydrogen per mass unit of fossil fuel used is considerably larger here than in other known methods, in which part of the fossil fuel is consumed for making available the energy required for water decomposition to produce additional hydrogen.

The residual coke produced in the hydrogenating coal gasification, however, can no longer be burned directly in power generating plant boilers because of its high sulfur content, and this would result in exceeding the sulfur dioxide emission limits. Here, the iron bath gasifier 23 which follows the hydrogenating coal gasifier 8 eliminates sulfur by the appropriate admixture of lime-containing additives to the residual coke and the exhaust gases from iron gasifier 23 are practically free of sulfur. The sulfur remains bound in the slag floating on the iron bath and can be drained off with the latter via the slag discharge 36.

In addition, the iron bath gasifier 23 also makes possible, due to its high temperature level, the combustion of reaction-inert carbon-rich and/or ballast-rich fossil fuels. Thus, hard coal, lignite, oil sand, oil shale and heavy oil residues can be used.

The combination of a hydrogenating coal gasifier 8, of a tube cracking furnace 3 for cracking methane, and an iron bath gasifier 23 for utilizing the residual coke yields, gives in addition, considerable flexibility in the adjustment of a given stoichiometric ratio of the generated gases, hydrogen and carbon monoxide. For one, a mass ratio of hydrogen and carbon monoxide of 2:1, as is required for the methanol synthesis, can be achieved if hard coal is used without problem by a 45% to 60% utilization thereof in the hydrogenating coal gasifier 8 and subsequent gasification of the residual coke produced thereby in the iron bath gasifier 23. Secondly, this mass ratio of hydrogen to carbon monoxide can be achieved also if the hydrogenating coal gasification is continued further depending on the fossil fuel used, and by supplementing the residual coke which is then available in smaller quantities in the iron bath gasifier 23, by other fossil fuels, for instance, lignite, oil, shale, oil sand or heavy oil residues.

If low calorific fossil fuels are used in the iron bath gasifier 23, care should be taken that the overall reaction remains sufficiently exothermic to keep the iron bath liquid. In addition, possible overproduction of carbon monoxide in the iron bath gasifier can be equalized without problem in this power generating station 1 by the conversion of part of the generated carbon monoxide gas in the converter 34 connected to the gas line 32, followed by a carbon dioxide scrubber 34. Also by using part of the carbon monoxide produced in the iron bath gasifier 23, which can be enriched slightly with hydrogen gas, as reducing gas for a steel mill, the supply of carbon monoxide gas for the following methanol synthesis plant 30 can be shifted in favor of hydrogen gas. The supply of hydrogen gas can be increased in this plant at the expense of carbon monoxide if in the low temperature separation plant 12, hydrogen and carbon monoxide are removed in separate lines 13, 37 and the carbon monoxide is fed into the conversion plant 20 following the tube cracking furnace 3. In this power generating station 1 the heat of the hot carbon monoxide gas flowing from the iron bath gasifier 23 at 1500° C. may be used to heat the medium pressure steam to above 1000° C. and to admix the thus heated steam to the methane flowing to the tube cracking furnace 3. By this additional heat input, the heat supply by the heat transport medium of the high-temperature reactor 2 can be reduced, its temperature can be lowered to a lower temperature level. Thereby, the problems related to materials and of other nature which are connected with very high exit temperatures of the heat transporting medium of the high-temperature reactor are avoided. At the same time, more heat is available for the steam generator 5 associated with the steam power generating station 1.

In this power generating plant, a pressure change absorption plant could also be used instead of the low temperature separation plant 12. Also, if the residual steam content of the exhaust gas flowing from the tube cracking furnace 3 is insufficient, additional steam could be fed through the line indicated by D into the converting plant 20.

The foregoing is a description corresponding, in substance, to German application No. P 34 15 223.7, dated Apr. 21, 1984, international priority of which is being claimed for the instant application and which is hereby made part of this application. Any material discrepancies between the foregoing specification and the specification of the aforementioned corresponding German application are to be resolved in favor of the latter.

| List of Reference Symbols | |
|---|---|
| Power generating station | 1 |
| High temperature reactor | 2 |
| Tube cracking oven | 3 |
| Steam power generating station | 4 |
| Steam generator | 5 |
| Hydrogen generator | 6 |
| Supply line | 7 |
| Coal gasifier | 8 |
| Heat exchanger | 9 |
| Steam generator arrangement | 10 |
| Gas purifier | 11 |
| Low-temperature gas decomposition plant | 12 |
| Compressor | 14 |
| Hydrogen supply line | 13 |
| Compressor | 15 |
| Heat exchanger | 16 |
| $CH_4$ | 17 |
| Hot-steam line | 18 |
| Steam generator | 19 |
| Converting plant | 20 |
| $CO_2$ scrubber | 21 |
| Plant for producing chemical raw materials | 22 |
| Iron bath gasifier | 23 |
| Air decomposition plant | 24 |
| Air compressor | 25 |
| Compressor | 26 |
| Oxygen line | 27 |
| Heat exchangers | 28, 29 |
| Methanol synthesis plant | 30 |
| Compressor | 31 |
| Gas line | 32 |
| Steel mill | 33 |
| Converting plant | 34 |
| Carbon dioxide scrubber | 35 |
| Purge gas | P |
| Slag run off | 36 |
| Steam | D |
| Gas line | 37 |
| Methanol | M |
| Ejector | 40 |
| Heat exchanger | 38 |
| Feed | 39 |

There are claimed:

1. Plant for generating steam and production of hydrogen and carbon monoxide suitable for producing chemical raw materials utilizing heat from a high-temperature reactor and carbon-containing material for conversion into gases, comprising:

a high-temperature reactor, a closed circuit for the flow of a heat transport medium from and to the high-temperature reactor, a tube cracking furnace interposed in the flow of the heat transfer medium for heating and cracking a methane-steam mixture flowing through the tube cracking furnace, a steam generator also interposed in the flow of the heat transfer medium for heating water in the steam generator and converting the water to steam, and a steam power generating station connected to receive the steam from the steam generator a coal gasifier with a coal inlet for introduction of feed coal containing sulfur and an $H_2$ inlet for introduction of hydrogen for partial hydrogenating coal gasification leaving residual coke containing sulfur, a coke outlet for the discharge of residual coke containing sulfur from the coal gasifier, an exhaust gas outlet line connected to the coal gasifier for the discharge of exhaust gas of the coal gasifier which contains methane, hydrogen, carbon dioxide, hydrogen sulfide, carbon monoxide and $H_2O$, a gas purifier connected to the exhaust gas line of the coal gasifier for the removal of $H_2S$ and $CO_2$, a low-temperature gas separation unit in the exhaust gas line following the gas purifier which separates a methane fraction from the purified exhaust gas of the coal gasifier, methane connecting means for flowing the methane fraction from the gas separation unit into the tube cracking furnace for cracking in the presence of steam into hydrogen and carbon monoxide, a tube cracking furnace discharge line connected to the furnace for the discharge of the cracked gases from the furnace, a heat exchanger connected to the tube cracking furnace discharge line in which heat exchanger the cracked gases leaving the furnace impart transfer heat to the methane fraction entering the furnace, a converting unit connected to the tube cracking furnace discharge line after the heat exchanger for converting the carbon monoxide in the cracked gases in the presence of steam to hydrogen and carbon dioxide, a carbon dioxide scrubber connected to the tube cracking furnace discharge line after the converting unit for removal of carbon dioxide leaving cracked gases rich in hydrogen, a discharge outlet connected to the scrubber for discharging the hydrogen rich gases into a hydrogen supply line, and connecting means for connecting the hydrogen supply line to the $H_2$ inlet of the coal gasifier for introduction of hydrogen an iron gasifier comprising a molten iron body in an enclosed vessel, connecting means from the coke outlet of the coal gasifier to the iron bath gasifier for feeding the residual coke containing sulfur to the molten iron body, an oxygen containing gas inlet in the iron bath gasifier for the introduction of an oxygen containing gas to convert the residual coke to carbon monoxide, a lime inlet in the iron bath gasifier for the introduction of lime to bind suflur in the residual coke in a layer of slag on the molten iron body, slag outlet means in the iron bath gasifier for discharging slag, an iron bath gasifier outlet line for the discharge or iron bath gas containing substantially sulfur-free carbon monoxide, at least one heat exchanger in the iron bath gasifier outlet line for generating superheated steam, conduit means connecting a steam line of said heat exchanger to the inlet side of the tube cracking furnace to introduce the superheated steam into the furnace, means for co-mingling a part of the hydrogen from the hydrogen supply line with carbon monoxide from the iron bath gasifier outlet line, and a plant for producing chemical raw materials to which the co-mingled gases are fed.

2. Plant according to claim 1, wherein following the iron bath gasifier are a plurality of heat exchangers and in at least one of the heat exchangers medium pressure steam is heated up.

3. Power generating station according to claim 2, including connecting means for feeding the heated-up steam into the tube cracking furnace.

4. Power generating station according to claim 2, wherein the steam is heated above the entrance temperature of the heat transporting medium of the high-temperature reactor in the tube cracking furnace.

5. Power generating station according to claim 2, including a pressure-increasing ejector for admixing the steam flowing from the heat exchanger with the methane flowing to the tube cracking furnace.

6. Plant according to claim 1, including another converting plant and a carbon dioxide scrubbing plant for converting at least part of the carbon monoxide-containing gas flowing from the iron bath gasifier, before conducting the gas to a plant for producing chemical raw materials.

7. Plant according to claim 1, including pipe and valves to connect the carbon monoxide-containing gas of the iron bath gasifier after cooling in the heat exchangers with the hydrogen gas flowing from the hydrogen supply line as reduction gas to a further plant for the production of chemical raw material.

8. Plant according to claim 1, wherein the plant for producing chemical raw materials is a methanol synthesis plant.

9. Plant according to claim 1, wherein the plant for producing chemical raw materials is a steel mill.

10. Plant according to claim 1, wherein the plant for the production of chemical raw materials is an ammonia synthesis plant, and wherein the iron bath gasifier has an inlet for introducing air enriched with oxygen, and the exhaust gas to be fed-in from the ammonia synthesis plant is subjected to complete conversion of the carbon monoxide to hydrogen.

11. Plant according to claim 1, wherein the carbon-containing material charged to the coal gasifier is hard coal with a partial hydrogenation coal gasification of 45 to 60% of the charged-in coal, for obtaining a stoichiometric ratio of hydrogen and carbon monoxide of 2:1 for use in the synthetsis of methanol.

12. Plant according to claim 1, including an ammonia synthesis plant and a steel mill wherein part of the carbon monoxide-containing gas produced in the iron bath gasifier is fed, together with hydrogen gas from the hydrogen gas supply line, to the methanol synthesis plant, and the other part to the steel mill.

13. Plant according to claim 8, wherein the carbon-containing material is the coal charged into the coal gasifier, for obtaining a stoichiometric ratio of hydrogen to carbon monoxide of 2:1 as required in the synthesis of methanol and further fossil fuel added in addition to the residual coke of the coal gasifier to the iron bath gasifier.

14. Plant according to claim 1, wherein the fuel fed to the iron bath gasifier, in addition to the residual coke which is a high-calorific fuel, is a low-calorific fuel such as lignite, oil shale, heavy oil residues, oil sand, and their mixtures, to produce a sufficiently large exothermic heat balance in the iron bath gasifier to maintain the iron bath molten.

15. Plant according to claim 14, wherein low-calorific fuels are preheated and or dryed before being fed to the iron bath gasifier.

16. Plant according to claim 1, including an air separation plant with the iron bath gasifier connected to an oxygen line of the air separation plant.

17. Plant according to claim 16, including a compressor interposed in the oxygen line for maintaining an overpressure in the iron bath gasifier.

18. Plant according to claim 8, including a separate line for conducting purge gas of the methanol synthesis plant to and in admixture to the methane flowing into the tube cracking furnace.

19. Plant according to claim 1, including a separate CO line connecting carbon monoxide separated in the low-temperature gas separation plant for direct feed of the carbon monoxide into the converting unit.

* * * * *